United States Patent
Hu et al.

(10) Patent No.: US 12,531,685 B2
(45) Date of Patent: Jan. 20, 2026

(54) METHOD AND DEVICE FOR DOWNLINK ASSIGNMENT INDEX-BASED HYBRID AUTOMATIC REPEAT REQUEST ACKNOWLEDGEMENT REPORTING IN WIRELESS COMMUNICATION

(71) Applicant: Apogee Networks, LLC, Dallas, TX (US)

(72) Inventors: Yang Hu, Shanghai (CN); Xiaobo Zhang, Shanghai (CN)

(73) Assignee: Apogee Networks, LLC, Dallas, TX (US)

( * ) Notice: Subject to any disclaimer, the term of this patent is extended or adjusted under 35 U.S.C. 154(b) by 291 days.

(21) Appl. No.: 18/111,611

(22) Filed: Feb. 20, 2023

(65) Prior Publication Data
US 2023/0224114 A1 Jul. 13, 2023

Related U.S. Application Data

(63) Continuation of application No. PCT/CN2022/127646, filed on Oct. 26, 2022.

(30) Foreign Application Priority Data

Oct. 29, 2021 (CN) .......................... 202111267571.8

(51) Int. Cl.
*H04L 5/00* (2006.01)
*H04L 1/1812* (2023.01)

(52) U.S. Cl.
CPC .......... *H04L 5/0048* (2013.01); *H04L 1/1812* (2013.01); *H04L 5/0055* (2013.01)

(58) Field of Classification Search
CPC .... H04L 5/0055; H04L 5/0048; H04L 1/1812
See application file for complete search history.

(56) References Cited

U.S. PATENT DOCUMENTS

| 11,438,125 B2 | 9/2022 | Zhang |
| 2016/0212744 A1 | 7/2016 | Lyu |

(Continued)

FOREIGN PATENT DOCUMENTS

| CN | 112152762 A | 12/2020 |
| CN | 113543231 A | 10/2021 |

OTHER PUBLICATIONS

Third Generation Partnership Project, "Technical Specification Group Radio Access Network; NR; Physical channels and modulation (Release 16)," 3GPP TS 38.211 V16.7.0 (Sep. 2021).

(Continued)

*Primary Examiner* — Elton Williams
(74) *Attorney, Agent, or Firm* — Volpe Koenig

(57) ABSTRACT

Method and device in nodes for wireless communication. A first receiver receives a first information block and a first signaling, the first information block is used to determine whether the first signaling comprises a target DAI field; a first transmitter transmits a target bit block in a first physical-layer channel, of a first bit block or a second bit block, at least the second bit block is used to generate the target bit block; wherein the first signaling is used to determine resources occupied by the first physical-layer channel; a first reference value is a default or configurable non-negative integer; when the first signaling does not comprise the target DAI field, the first bit block is used to generate a third bit block, the third bit block comprises at least one bit, a number of bit(s) comprised in the third bit block is equal to the first reference value.

17 Claims, 4 Drawing Sheets

(56) References Cited

U.S. PATENT DOCUMENTS

2018/0205504 A1* 7/2018 Lyu ..................... H04L 5/0055
2019/0173651 A1 6/2019 Zhang
2023/0198681 A1 6/2023 Zhang

OTHER PUBLICATIONS

Third Generation Partnership Project, "Technical Specification Group Radio Access Network; NR; Physical channels and modulation (Release 17)," 3GPP TS 38.211 V17.3.0 (Sep. 2022).
Third Generation Partnership Project, "Technical Specification Group Radio Access Network; NR; Multiplexing and channel coding (Release 16)," 3GPP TS 38.212 V16.7.0 (Sep. 2021).
Third Generation Partnership Project, "Technical Specification Group Radio Access Network; NR; Multiplexing and channel coding (Release 17)," 3GPP TS 38.212 V17.3.0 (Sep. 2022).
Third Generation Partnership Project, "Technical Specification Group Radio Access Network; NR; Physical layer procedures for control (Release 16)," 3GPP TS 38.213 V16.7.0 (Sep. 2021).
Third Generation Partnership Project, "Technical Specification Group Radio Access Network; NR; Physical layer procedures for control (Release 17)," 3GPP TS 38.213 V17.3.0 (Sep. 2022).
Third Generation Partnership Project, "Technical Specification Group Radio Access Network; NR; Physical layer procedures for data (Release 16)," 3GPP TS 38.214 V16.7.0 (Sep. 2021).
Third Generation Partnership Project, "Technical Specification Group Radio Access Network; NR; Physical layer procedures for data (Release 17)," 3GPP TS 38.214 V17.3.0 (Sep. 2022).
Third Generation Partnership Project, "Technical Specification Group Radio Access Network; NR; Radio Resource Control (RRC) protocol specification (Release 16)," 3GPP TS 38.331 V16.6.0 (Sep. 2021).
Third Generation Partnership Project, "Technical Specification Group Radio Access Network; NR; Radio Resource Control (RRC) protocol specification (Release 17)," 3GPP TS 38.331 V17.2.0 (Sep. 2022).

* cited by examiner

METHOD AND DEVICE FOR DOWNLINK ASSIGNMENT INDEX-BASED HYBRID AUTOMATIC REPEAT REQUEST ACKNOWLEDGEMENT REPORTING IN WIRELESS COMMUNICATION

CROSS REFERENCE TO RELATED APPLICATIONS

This application is a continuation of the international patent application No. PCT/CN2022/127646, filed on Oct. 26, 2022, which claims the priority benefit of Chinese Patent Application No. 202111267571.8, filed on Oct. 29, 2021, the full disclosure of which is incorporated herein by reference.

BACKGROUND

Technical Field

The present application relates to transmission methods and devices in wireless communication systems, and in particular to a transmission method and device of a radio signal in a wireless communication supporting cellular networks.

Related Art

In 3rd Generation Partner Project (3GPP) New Radio (NR) system, in order to support Ultra Reliable and Low Latency Communications (URLLC) services with higher demands (such as higher reliability and lower latency), various enhancements for uplink transmission have been supported in NR Release 16 version.

In a Work Item (WI) of continuing to enhance the URLLC in NR Release 17, multiplexing of different intra-User Equipment (Intra-UE) services is a key point to be studied.

SUMMARY

When Hybrid Automatic Repeat reQuest ACKnowledgement (HARQ-ACK) bits with different priorities are multiplexed into a same Physical Uplink Control CHannel (PUCCH) or Physical Uplink Shared CHannel (PUSCH), the transmission reliability of a high-priority HARQ-ACK bit (such as a HARQ-ACK bit for URLLC services) will be affected by a low-priority HARQ-ACK bit (such as a HARQ-ACK bit for enhanced Mobile BroadBand (eMBB) services); how to ensure the transmission reliability of the high-priority HARQ-ACK bit is a key problem to be solved for implementing the multiplexing between different services.

To address the above problem, the present application provides a solution. It should be noted that in the description of the present application, URLLC is taken as a typical application scenario or example; the present application is also applicable to other scenarios, for example, multi-transmission/reception node transmission, Internet of Things (IoT), Multicast and Broadcast Services (MBS), Internet of Vehicles (IoV), Non-Terrestrial Networks (NTN), etc., where similar technical effects can be achieved. In addition, the adoption of a unified solution in different scenarios (including but not limited to URLLC, multi-transmission/reception node transmission, IoT, MS, IoV, NTN) also helps to reduce hardware complexity and cost, or improve performance. If no conflict is incurred, embodiments in any node in the present application and the characteristics of the embodiments are also applicable to any other node, and vice versa. And the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:
  receiving a first information block and a first signaling, the first information block being used to determine whether the first signaling comprises a target Downlink Assignment Index (DAI) field; and
  transmitting a target bit block in a first physical-layer channel, of a first bit block or a second bit block, at least the second bit block being used to generate the target bit block, the target bit block comprising at least one bit;
  herein, the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block.

In one embodiment, a problem to be solved in the present application includes: how to reduce the negative impact of a low-priority HARQ-ACK bit on the transmission reliability of a high-priority HARQ-ACK bit under different configurations.

In one embodiment, a problem to be solved in the present application includes: inconsistent understanding of a number of low-priority HARQ-ACK bit(s) between communication parties will lead to an incorrect decoding of a high-priority HARQ-ACK bit on the base station side, how to enhance the consistency of understanding of the number of low-priority HARQ-ACK bit(s) between communication parties.

In one embodiment, characteristics of the above method comprise: whether an extra processing is performed (such as quantization or bundling) on a low-priority HARQ-ACK bit is determined according to whether a DAI field for a low-priority HARQ-ACK bit is comprised in a DCI format used to schedule a PUCCH or a PUSCH, so as to enhance the understanding consistency of both communication parties on a number of low-priority HARQ-ACK bit(s).

In one embodiment, characteristics of the above method comprise: different processing methods are used for the first bit block under different configurations to ensure that the transmission reliability of the second bit block can be guaranteed in different scenarios.

In one embodiment, characteristics of the above method comprise: when the first signaling does not comprise the target DAI field, a number of bit(s) related to the first bit block and multiplexed into the first physical-layer channel is always a value agreed by both communication parties (that is, the first reference value in the present application).

In one embodiment, advantages of the above method comprise: on the premise of ensuring the transmission reliability of the high-priority HARQ-ACK bits, the flexibility of the base station configuration is enhanced. The base station can determine whether to increase the DCI signaling overhead according to different scenarios to enhance the consistency of understanding between both communication parties on the number of low-priority HARQ-ACK bit(s).

In one embodiment, advantages of the above method comprise ensuring the transmission reliability of high-priority HARQ-ACK bits.

In one embodiment, advantages of the above method comprise being conducive to reducing the DCI signaling overhead.

In one embodiment, advantages of the above method comprise being conducive to enhancing the transmission performance of low-priority HARQ-ACK bits, so as to improve the overall efficiency of the system.

According to one aspect of the present application, the above method is characterized in that any bit comprised in the second bit block belongs to the target bit block.

According to one aspect of the present application, the above method is characterized in that when the first signaling comprises the target DAI field: the target DAI field in the first signaling is used to indicate the number of HARQ-ACK bit(s) comprised in the first bit block.

According to one aspect of the present application, the above method is characterized in that the number of HARQ-ACK bit(s) comprised in the first bit block is greater than the first reference value; when the first signaling does not comprise the target DAI field: a bit in the third bit block is an output after at least one operation of logical AND, logical OR, or exclusive OR (XOR) of HARQ-ACK bit(s) in the first bit block.

According to one aspect of the present application, the above method is characterized in that a number of HARQ-ACK bit(s) comprised in the first bit block is greater than the first reference value; when the first signaling does not comprise the target DAI field: the third bit block comprises only partial HARQ-ACK bit(s) in the first bit block, and each of bit(s) not belonging to the third bit block in the first bit block does not belong to the target bit block.

According to one aspect of the present application, the above method is characterized in that the first bit block corresponds to a first priority index, the second bit block corresponds to a second priority, and the first priority index is different from the second priority index.

According to one aspect of the present application, the above method is characterized in comprising:

receiving a second information block;

herein, the second information block is used to determine the first reference value.

The present application provides a method in a second node for wireless communications, comprising:

transmitting a first information block and a first signaling, the first information block being used to determine whether the first signaling comprises a target DAI field; and receiving a target bit block in a first physical-layer channel, of a first bit block or a second bit block, at least the second bit block being used to generate the target bit block, the target bit block comprising at least one bit;

herein, the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block.

According to one aspect of the present application, the above method is characterized in that any bit comprised in the second bit block belongs to the target bit block.

According to one aspect of the present application, the above method is characterized in that when the first signaling comprises the target DAI field: the target DAI field in the first signaling is used to indicate the number of HARQ-ACK bit(s) comprised in the first bit block.

According to one aspect of the present application, the above method is characterized in that the number of HARQ-ACK bit(s) comprised in the first bit block is greater than the first reference value;

when the first signaling does not comprise the target DAI field: a bit in the third bit block is an output after at least one operation of logical AND, logical OR, or XOR of HARQ-ACK bit(s) in the first bit block.

According to one aspect of the present application, the above method is characterized in that a number of HARQ-ACK bit(s) comprised in the first bit block is greater than the first reference value;

when the first signaling does not comprise the target DAI field: the third bit block comprises only partial HARQ-ACK bit(s) in the first bit block, and each of bit(s) not belonging to the third bit block in the first bit block does not belong to the target bit block.

According to one aspect of the present application, the above method is characterized in that the first bit block corresponds to a first priority index, the second bit block corresponds to a second priority, and the first priority index is different from the second priority index.

According to one aspect of the present application, the above method is characterized in comprising:

transmitting a second information block;

herein, the second information block is used to determine the first reference value.

The present application provides a first node for wireless communications, comprising:

a first receiver, receiving a first information block and a first signaling, the first information block being used to determine whether the first signaling comprises a target DAI field; and a first transmitter, transmitting a target bit block in a first physical-layer channel, of a first bit block or a second bit block, at least the second bit block being used to generate the target bit block, the target bit block comprising at least one bit;

herein, the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block.

The present application provides a second node for wireless communications, comprising:

a second transmitter, transmitting a first information block and a first signaling, the first information block being used to determine whether the first signaling comprises a target DAI field; and a second receiver, receiving a target bit block in a first physical-layer channel, of a first bit block or a second bit block, at least the second bit block being used to generate the target bit block, the target bit block comprising at least one bit;

herein, the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block.

In one embodiment, methods in the present application are advantageous in the following aspects:

the flexibility of base station configuration and scheduling is enhanced;

the transmission reliability of high-priority HARQ-ACK bits is ensured;

the DCI signaling overhead is conducive to be reduced;

the reporting performance of low-priority HARQ-ACK information is conducive to be enhanced;

the overall efficiency of the system is improved;

small workload for standard revision is required.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical solution of the present application will be further described in detail below in combination with the drawings. It should be noted that, in the case of no conflict, the embodiments of the present application and the features in the embodiments may be combined with each other arbitrarily.

Embodiment 1

Figure 1:
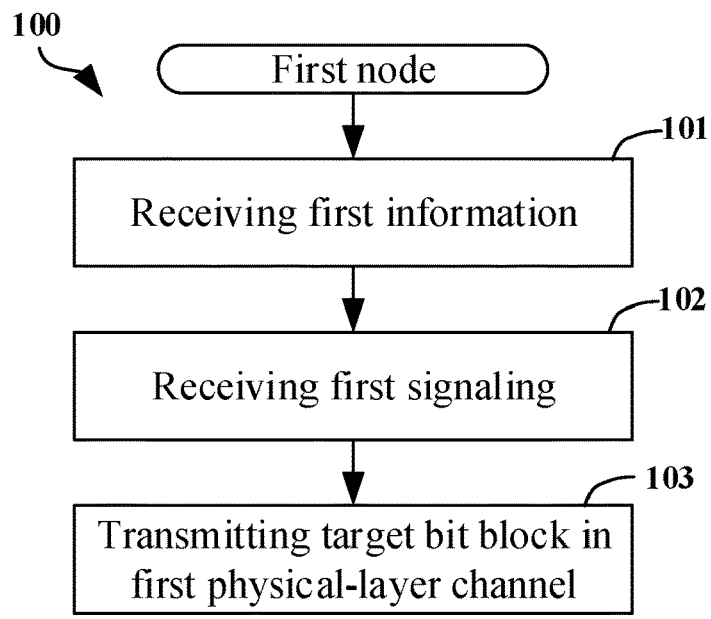
FIG. 1 illustrates a flowchart of the processing of a first node according to one embodiment of the present application.

Embodiment 1 illustrates a flowchart of processing of a first node according to one embodiment of the present application, as shown in FIG. 1.

In Embodiment 1, the first node in the present application receives first information in step 101; receives a first signaling in step 102; transmits a target bit block in a first physical-layer channel in step 103.

In Embodiment 1, the first information block is used to determine whether the first signaling comprises a target DAI field; of a first bit block or a second bit block, at least the second bit block being used to generate the target bit block, the target bit block comprising at least one bit; the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block.

In one embodiment, the first information block comprises a higher-layer signaling.

In one embodiment, the first information block is an RRC signaling.

In one embodiment, the first information block comprises one or multiple fields in an RRC signaling.

In one embodiment, the first information block is an Information Element (IE).

In one embodiment, the first information block comprises one or multiple IEs.

In one embodiment, the first information block comprises one or multiple fields in an IE.

In one embodiment, the first information block is a Medium Access Control layer Control Element (MAC CE) signaling.

In one embodiment, the first information block comprises one or multiple fields in a MAC CE signaling.

In one embodiment, the first information block comprises an IE PDSCH-Config.

In one embodiment, the first information block comprises an IE PhysicalCellGroupConfig.

In one embodiment, the first information block comprises an IE PUCCH-Config.

In one embodiment, the first information block comprises an IE PDCCH-Config.

In one embodiment, the first information block comprises an IE SearchSpace.

In one embodiment, the first information block comprises an IE ControlResourceSet.

In one embodiment, the first information block is an IE PDSCH-Config.

In one embodiment, the first information block is an IE PhysicalCellGroupConfig.

In one embodiment, the first information block is an IE PUCCH-Config.

In one embodiment, the first information block is an IE PDCCH-Config.

In one embodiment, the first information block is an IE SearchSpace.

In one embodiment, the first information block is an IE ControlResourceSet.

In one embodiment, names of the above IEs are not case-insensitive.

In one embodiment, names of the first information block comprise DAI (case-insensitive).

In one embodiment, names of the first information block comprise downlinkAssignmentIndex (case-insensitive).

In one embodiment, the first signaling is a physical-layer signaling.

In one embodiment, the first signaling is a Downlink control information (DCI) format.

In one embodiment, the first signaling is one of DCI format 1_1 or DCI format 1_2.

In one embodiment, the first signaling is one of DCI format 0_1 or DCI format 0_2.

In one embodiment, the first signaling is DCI format 1_0, and for the specific meaning of the DCI format 1_0, refer to section 7.3.1.2 in 3GPP TS38.212.

In one embodiment, the first signaling is DCI format 1_1, and for the specific meaning of the DCI format 1_1, refer to section 7.3.1.2 in 3GPP TS38.212.

In one embodiment, the first signaling is DCI format 1_2, and for the specific meaning of the DCI format 1_2, refer to section 7.3.1.2 in 3GPP TS38.212.

In one embodiment, the first signaling is DCI format 0_0, and for the specific meaning of the DCI format 0_0, refer to section 7.3.1.1 in 3GPP TS38.212.

In one embodiment, the first signaling is DCI format 0_1, and for the specific meaning of the DCI format 0_1, refer to section 7.3.1.1 in 3GPP TS38.212.

In one embodiment, the first signaling is DCI format 0_2, and for the specific meaning of the DCI format 0_2, refer to section 7.3.1.1 in 3GPP TS38.212.

In one embodiment, the first signaling comprises one or multiple fields in a DCI format.

In one embodiment, the first signaling is a DownLink Grant Signaling.

In one embodiment, the first signaling is an UpLink Grant Signaling.

In one embodiment, the first signaling is a higher-layer signaling.

In one embodiment, the first signaling is an RRC signaling.

In one embodiment, the first signaling comprises one or plurality of fields in an RRC signaling.

In one embodiment, the first signaling comprises an IE.

In one embodiment, the second signaling comprises one or multiple fields in an IE.

In one embodiment, the first signaling is a Medium Access Control layer Control Element (MAC CE) signaling.

In one embodiment, the first signaling comprises one or multiple fields in a MAC CE signaling.

In one embodiment, the first information block is used to indicate whether the first signaling comprises the target DAI field.

In one embodiment, the first information block is used to explicitly indicate whether the first signaling comprises the target DAI field.

In one embodiment, the first information block is used to implicitly indicate whether the first signaling comprises the target DAI field.

In one embodiment, the first information block is used to configure whether the first signaling comprises the target DAI field.

In one embodiment, the first information block comprising a field is used to indicate that the first signaling comprises the target DAI field, and the first information block not comprising the field is used to indicate that the first signaling does not comprise the target DAI field.

In one embodiment, the first information block comprising a field is used to indicate that the first signaling does not comprise the target DAI field, and the first information block not comprising the field is used to indicate that the first signaling comprises the target DAI field.

In one embodiment, the first physical-layer channel is a PUCCH.

In one embodiment, the first physical-layer channel is a PUSCH.

In one embodiment, the first physical-layer channel is a physical uplink channel.

In one embodiment, the meaning of the phrase of transmitting a target bit block in a first physical-layer channel comprises: a target bit block comprises a first target bit sub-block and a second target bit sub-block, code bit sequences acquired after the first target bit sub-block and the second target bit sub-block respectively through channel coding are transmitted in a first physical-layer channel.

In one embodiment, the meaning of the phrase of transmitting a target bit block in a first physical-layer channel comprises: a target bit block comprises a first target bit sub-block and a second target bit sub-block, and both the first target bit sub-block and the second target bit sub-block are transmitted in a first physical-layer channel.

In one embodiment, the target bit block is through at least Cyclic Redundancy Check (CRC) attachment, Code Block Segmentation, Code Block attachment, Channel Coding, Rate Matching and Code Block Concatenation, Scrambling and Modulation and Resource Block mapping before being transmitted in the first physical-layer channel.

In one embodiment, the target bit block is through at least CRC attachment, Channel Coding and Rate Matching, Scrambling and Modulation and Resource Mapping before being transmitted in the first physical-layer channel.

In one embodiment, the target bit block is through at least CRC attachment, Code Block Segmentation, Code Block attachment, Channel Coding, Rate Matching and Code Block Concatenation, Scrambling, Modulation, Layer Mapping, Antenna Port Mapping and Resource Block mapping before being transmitted in the first physical-layer channel.

In one embodiment, the target bit block is through at least Sequence Generation and Mapping to physical resources before being transmitted in the first physical-layer channel.

In one embodiment, the target bit block is through at least Channel Coding, Rate Matching, Scrambling and Modulation and Mapping to physical resources before being transmitted in the first physical-layer channel.

In one embodiment, the target bit block is through at least Channel Coding, Rate Matching, Scrambling, Modulation, layer mapping and resource block mapping before being transmitted in the first physical-layer channel.

In one embodiment, the target bit block is transmitted in the first physical-layer channel after being through at least part of CRC attachment, Code Block Segmentation, Code Block CRC attachment, Channel Coding, Rate Matching, Code Block Concatenation, Scrambling, Modulation, Spreading, Layer Mapping, Precoding, Mapping to Physical Resources, Multicarrier Symbol Generation and Modulation and Upconversion.

In one embodiment, the target bit block comprises at least one HARQ-ACK bit.

In one embodiment, each of bit(s) in the target bit block is a HARQ-ACK bit.

In one embodiment, each of bit(s) in the target bit block is an Uplink control information (UCI) bit.

In one embodiment, the target bit block comprises at least one Channel state information (CSI) bit.

In one embodiment, the HARQ-ACK bit is a HARQ-ACK information bit.

In one embodiment, both the first bit block and the second bit block are used to generate the target bit block.

In one embodiment, the target bit block comprises an output after at least one operation of logical AND, logical OR or XOR of HARQ-ACK bits in the second bit block.

In one embodiment, the second bit block comprises multiple bits, and only partial bits in the second bit block belong to the target bit block.

In one embodiment, the target bit block comprises the second bit block.

In one embodiment, a number of HARQ-ACK bit(s) comprised in the first bit block is equal to 1.

In one embodiment, a number of HARQ-ACK bits comprised in the first bit block is equal to 2.

In one embodiment, a number of HARQ-ACK bits comprised in the first bit block is equal to 3.

In one embodiment, a number of HARQ-ACK bits comprised in the first bit block is equal to 4.

In one embodiment, a number of HARQ-ACK bit(s) comprised in the first bit block is equal to 8.

In one embodiment, a number of HARQ-ACK bit(s) comprised in the first bit block is equal to 5.

In one embodiment, a number of HARQ-ACK bit(s) comprised in the first bit block is equal to 6.

In one embodiment, a number of HARQ-ACK bit(s) comprised in the first bit block is equal to 7.

In one embodiment, a number of HARQ-ACK bits comprised in the first bit block is greater than 3.

In one embodiment, a number of HARQ-ACK bits comprised in the first bit block is greater than 4.

In one embodiment, a number of HARQ-ACK bit(s) comprised in the first bit block is not greater than 1706.

In one embodiment, a number of HARQ-ACK bit(s) comprised in the second bit block is equal to 1.

In one embodiment, a number of HARQ-ACK bits comprised in the second bit block is equal to 2.

In one embodiment, a number of HARQ-ACK bits comprised in the second bit block is equal to 3.

In one embodiment, a number of HARQ-ACK bits comprised in the second bit block is greater than 3.

In one embodiment, a number of HARQ-ACK bits comprised in the second bit block is greater than 4.

In one embodiment, a number of HARQ-ACK bit(s) comprised in the second bit block is not greater than 1706.

In one embodiment, the first bit block comprises only a HARQ-ACK bit.

In one embodiment, the second bit block comprises only a HARQ-ACK bit.

In one embodiment, the first bit block comprises only a UCI bit.

In one embodiment, the second bit block comprises only a UCI bit.

In one embodiment, the first signaling is used to indicate resources occupied by the first physical-layer channel.

In one embodiment, the first signaling is used to explicitly indicate resources occupied by the first physical-layer channel.

In one embodiment, the first signaling is used to implicitly indicate resources occupied by the first physical-layer channel.

In one embodiment, the first signaling is used to indicate time-domain resources occupied by the first physical-layer channel.

In one embodiment, the first signaling is used to indicate frequency-domain resources occupied by the first physical-layer channel.

In one embodiment, the first signaling is used to configure resources occupied by the first physical-layer channel.

In one embodiment, the first physical-layer channel is a PUCCH, and the first signaling is used to indicate PUCCH resources occupied by the first physical-layer channel.

In one embodiment, the first physical-layer channel is a PUCCH, and the first signaling is used to indicate PUCCH resources occupied by the first physical-layer channel out of a PUCCH resource set.

In one embodiment, the meaning of the phrase of a type of the first bit block being different from a type of the second bit block comprises: a type of a HARQ-ACK bit in the first bit block is different from a type of a HARQ-ACK bit in the second bit block.

In one embodiment, a HARQ-ACK bit in the first bit block and a HARQ-ACK bit in the second bit block are respectively HARQ-ACK bits with different priorities.

In one embodiment, a HARQ-ACK bit in the first bit block and a HARQ-ACK bit in the second bit block are respectively for different priority indexes.

In one embodiment, a HARQ-ACK bit in the first bit block and a HARQ-ACK bit in the second bit block are respectively associated with different priority indexes.

In one embodiment, the type in the present application is: priority.

In one embodiment, the type of the first bit block is: a priority of the first bit block; and the type of the second bit block is: a priority of the second bit block.

In one embodiment, the type of the first bit block is: a priority index corresponding to the first bit block; and the type of the second bit block is: a priority index corresponding to the second bit block.

In one embodiment, the meaning of the phrase of a type of the first bit block being different from a type of the second bit block comprises: the first bit block and the second bit block respectively correspond to different priority indexes.

In one embodiment, the meaning of the phrase of a type of the first bit block being different from a type of the second bit block comprises: a HARQ-ACK bit in the first bit block and a HARQ-ACK bit in the second bit block respectively have different priority indexes.

In one embodiment, a priority of the first bit block is a priority of a HARQ-ACK bit in the first bit block, and a priority of the second bit block is a priority of a HARQ-ACK bit in the second bit block.

In one embodiment, the type in the present application is: a feedback mode.

In one embodiment, the type of the first bit block is: a feedback mode corresponding to the first bit block; and the type of the second bit block is: a feedback mode corresponding to the second bit block.

In one embodiment, the type in the present application is: a communication mode (such as multicast or unicast).

In one embodiment, the type of the first bit block is: a communication mode corresponding to the first bit block; and the type of the second bit block is: a communication mode corresponding to the second bit block.

In one embodiment, HARQ-ACK bits in the first bit block are HARQ-ACK bits used for MBS, and HARQ-ACK bits in the second bit block are HARQ-ACK bits used for unicast.

In one embodiment, HARQ-ACK bits in the second bit block are HARQ-ACK bits used for MS, and HARQ-ACK bits in the first bit block are HARQ-ACK bits used for unicast.

In one embodiment, the type in the present application is a type related to a Radio Network Temporary Identifier (RNTI), and different types correspond to different RNTIs.

In one embodiment, the meaning of the phrase of a type of the first bit block being different from a type of the second bit block comprises: a HARQ-ACK bit in the first bit block and a HARQ-ACK bit in the second bit block are respectively for different RNTIs.

In one embodiment, different types correspond to different HARQ-ACK sub-codebooks; the meaning of the phrase of a type of the first bit block being different from a type of the second bit block comprises: the first bit block and the second bit block respectively comprise HARQ-ACK bits belonging to different HARQ-ACK sub-codebooks.

In one embodiment, the first reference value is equal to 1.

In one embodiment, the first reference value is equal to 2.

In one embodiment, the first reference value is equal to 3.

In one embodiment, the first reference value is not greater than 1706.

In one embodiment, the first reference value is a positive integer configured by a higher-layer signaling.

In one embodiment, the meaning of the phrase of a first reference value being a default or configurable non-negative integer comprises: a first reference value is a constant.

In one embodiment, the meaning of the phrase of a first reference value being a default or configurable non-negative integer comprises: a first reference value is a value configured by an RRC signaling.

In one embodiment, the meaning of the phrase of a first reference value being a default or configurable non-negative integer comprises: a first reference value is one reference value in a first reference value set, the first reference value set comprises multiple reference values, any reference value in the first reference value set is pre-configured or configured by an RRC signaling, and a physical-layer signaling or a higher-layer signaling is used to indicate the first reference value out of the first reference value set.

In one subembodiment of the above embodiment, the first signaling is used to indicate the first reference value out of the first reference value set.

In one subembodiment of the above embodiment, a MAC CE signaling is used to indicate the first reference value out of the first reference value set.

In one subembodiment of the above embodiment, an RRC signaling is used to indicate the first reference value out of the first reference value set.

In one embodiment, the target Downlink Assignment Index (DAI) field comprises at least one bit.

In one embodiment, the target DAI field is a field in DCI format 1_1.

In one embodiment, the target DAI field is a field in DCI format 1_2.

In one embodiment, the target DAI field is a field in DCI format 1_1 or DCI format 1_2.

In one embodiment, the target DAI field is a field in DCI format 0_1.

In one embodiment, the target DAI field is a field in DCI format 0_2.

In one embodiment, the target DAI field is a field in DCI format 0_1 or DCI format 0_2.

In one embodiment, the target DAI field is a DAI field.

In one embodiment, the target DAI field is a counter DAI field.

In one embodiment, the target DAI field is a total DAI field.

In one embodiment, the target DAI field is an UpLink (UL) DAI field.

In one embodiment, the target DAI field is a DAI field for HARQ-ACK bits of the same type as the type of the first bit block.

In one embodiment, the target DAI field is a total DAI field for HARQ-ACK bits of the same type as the type of the first bit block.

In one embodiment, the target DAI field is a DAI field for HARQ-ACK bits associated with priority index 0.

In one embodiment, the target DAI field is a total DAI field for HARQ-ACK bits associated with priority index 0.

In one embodiment, the target DAI field is a DAI field for HARQ-ACK bits associated with priority index 1.

In one embodiment, the target DAI field is a total DAI field for HARQ-ACK bits associated with priority index 1.

In one embodiment, whether the first signaling comprises the target DAI field is used to determine the target bit block.

In one embodiment, whether the first signaling comprises the target DAI field is used to determine a relation between the target bit block and the first bit block.

In one embodiment, the meaning of the phrase of the target DAI field in the first signaling being used to determine a number of HARQ-ACK bit(s) comprised in the first bit block comprises: a value of the target DAI field in the first signaling is used to perform counting to acquire a number of HARQ-ACK bit(s) comprised in the first bit block.

In one embodiment, the meaning of the phrase of the target DAI field in the first signaling being used to determine a number of HARQ-ACK bit(s) comprised in the first bit block comprises: the target DAI field in the first signaling is used to indicate a number of HARQ-ACK bit(s) comprised in the first bit block.

In one embodiment, the meaning of the phrase of the target DAI field in the first signaling being used to determine a number of HARQ-ACK bit(s) comprised in the first bit block comprises: the target DAI field in the first signaling is used to explicitly indicate a number of HARQ-ACK bit(s) comprised in the first bit block.

In one embodiment, the meaning of the phrase of the target DAI field in the first signaling being used to determine a number of HARQ-ACK bit(s) comprised in the first bit block comprises: the target DAI field in the first signaling is used to implicitly indicate a number of HARQ-ACK bit(s) comprised in the first bit block.

In one embodiment, the meaning of the phrase of the target DAI field in the first signaling being used to determine a number of HARQ-ACK bit(s) comprised in the first bit block comprises: a number of HARQ-ACK bit(s) comprised in the first bit block is linearly correlated with a value of the target DAI field in the first signaling.

In one embodiment, the meaning of the phrase of the target DAI field in the first signaling being used to determine a number of HARQ-ACK bit(s) comprised in the first bit block comprises: a number of HARQ-ACK bit(s) comprised in the first bit block is equal to a first intermediate quantity multiplied by 2, and the first intermediate quantity is linearly correlated with a value of the target DAI field in the first signaling.

In one embodiment, the meaning of the phrase of the target DAI field in the first signaling being used to determine a number of HARQ-ACK bit(s) comprised in the first bit block comprises: a number of HARQ-ACK bit(s) comprised in the first bit block is a multiple of a first intermediate quantity, and the first intermediate quantity is linearly correlated with a value of the target DAI field in the first signaling.

In one embodiment, the meaning of the phrase of the target DAI field in the first signaling being used to determine a number of HARQ-ACK bit(s) comprised in the first bit block comprises: a number of HARQ-ACK bit(s) comprised in the first bit block is equal to a non-negative integral multiple of T1 plus a value of the target DAI field in the first signaling, T1 being a positive integer.

In one embodiment, the meaning of the phrase of the target DAI field in the first signaling being used to determine a number of HARQ-ACK bit(s) comprised in the first bit block comprises: a number of HARQ-ACK bit(s) comprised in the first bit block is equal to a first intermediate quantity multiplied by 2, and the first intermediate quantity is equal to a non-negative integral multiple of T1 plus a value of the target DAI field in the first signaling, T1 being a positive integer.

In one embodiment, the meaning of the phrase of the target DAI field in the first signaling being used to determine a number of HARQ-ACK bit(s) comprised in the first bit block comprises: a number of HARQ-ACK bit(s) comprised in the first bit block is a multiple of a first intermediate quantity, and the first intermediate quantity is equal to a non-negative integral multiple of T1 plus a value of the target DAI field in the first signaling, T1 being a positive integer.

In one embodiment, T1 is equal to 4.

In one embodiment, T1 is equal to 2.

In one embodiment, T1 is equal to T2 power of 2, and T2 is a number of bit(s) comprised in a counter DAI field.

In one embodiment, T1 is equal to T2 power of 2, and T2 is a number of bit(s) comprised in a counter DAI field used to count a number of HARQ-ACK bit(s) associated with a priority index 0.

In one embodiment, when the first signaling comprises the target DAI field: the target bit block comprises only the first bit block and the second bit block.

In one embodiment, the meaning of the phrase of the first bit block being used to generate a third bit block comprises: a third bit block comprises an output after at least one operation of logical AND, logical OR, or XOR of at least partial bits in the first bit block.

In one embodiment, the meaning of the phrase of the first bit block being used to generate a third bit block comprises: a third bit block comprises at least partial bits in the first bit block.

In one embodiment, a number of HARQ-ACK bit(s) comprised in the first bit block is less than the first reference value; when the first signaling does not comprise the target DAI field: the third bit block comprises the first bit block and at least one padding bit.

In one embodiment, the padding bit is a bit with a value of 0.

In one embodiment, the padding bit is a bit with a value of 1.

In one embodiment, the padding bit is a repetition of a bit in the first bit block.

In one embodiment, each of bit(s) in the third bit block is a HARQ-ACK bit.

In one embodiment, each of bit(s) in the third bit block is a UCI bit.

In one embodiment, a number of HARQ-ACK bit(s) comprised in the first bit block is greater than the first reference value; when the first signaling does not comprise the target DAI field: the third bit block comprises only partial bits and at least one compressed bit in the first bit block, and the at least one compressed bit is an output after at least one operation of logical AND, logical OR, or XOR of HARQ-ACK bit(s) in the first bit block.

In one embodiment, a number of HARQ-ACK bit(s) comprised in the first bit block is greater than the first reference value; when the first signaling does not comprise the target DAI field: the third bit block comprises only partial bits and at least one compressed bit in the first bit block, and the compressed bit is equal to a result of values after an operation of logical AND of multiple HARQ-ACK bits in the first bit block.

In one embodiment, each of bit(s) in the target bit block is a bit before through channel coding.

In one embodiment, the first node also receives at least one PDSCH, the first signaling is used to schedule the at least one PDSCH, and the second bit block comprises at least one HARQ-ACK bit for a Transport Block (TB) or a Code Block Group (CBG) in the at least one PDSCH.

In one embodiment, in the present application, the meaning of a number of bit(s) comprised in a bit comprises how many bit(s) comprised in the bit block.

In one embodiment, in the present application, the meaning of a number of HARQ-ACK bit(s) comprised in a bit comprises how many HARQ-ACK bit(s) comprised in the bit block.

In one embodiment, in the present application, a number of bit(s) comprised in a bit block refers to a size of the bit block.

Embodiment 2

Figure 2:
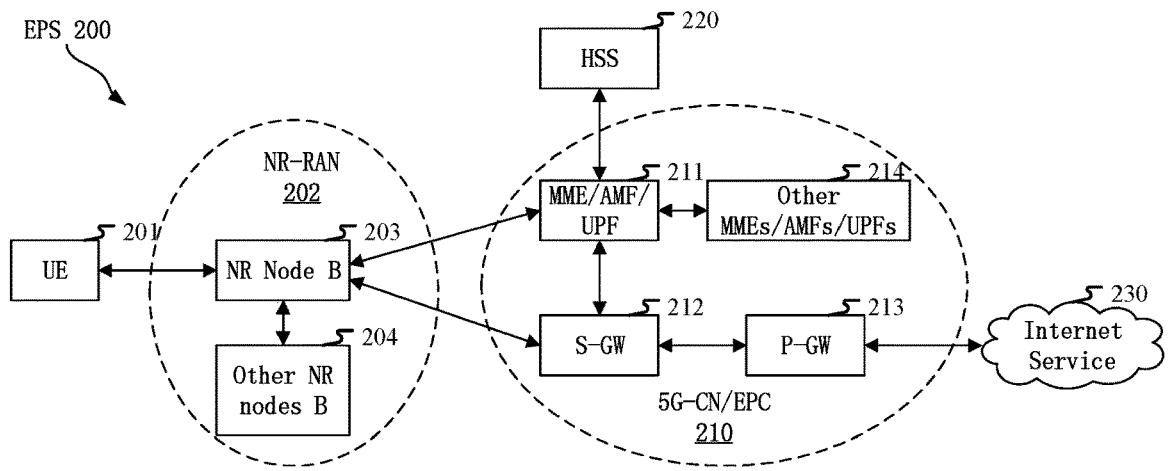
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201—oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an Sl/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 corresponds to the second node in the present application.

In one embodiment, the gNB 203 corresponds to the first node in the present application.

In one embodiment, the gNB 203 corresponds to the second node in the present application.

In one embodiment, the UE 201 corresponds to the first node in the present application, and the gNB 203 corresponds to the second node in the present application.

In one embodiment, the gNB 203 is a MarcoCellular base station.

In one embodiment, the gNB 203 is a Micro Cell base station.

In one embodiment, the gNB 203 is a PicoCell base station.

In one embodiment, the gNB 203 is a Femtocell.

In one embodiment, the gNB 203 is a base station that supports large latency differences.

In one embodiment, the gNB 203 is a flight platform.

In one embodiment, the gNB 203 is satellite equipment.

In one embodiment, both the first node and the second node in the present application correspond to the UE 201, for example, V2X communications are performed between the first node and the second node.

Embodiment 3

Figure 3:
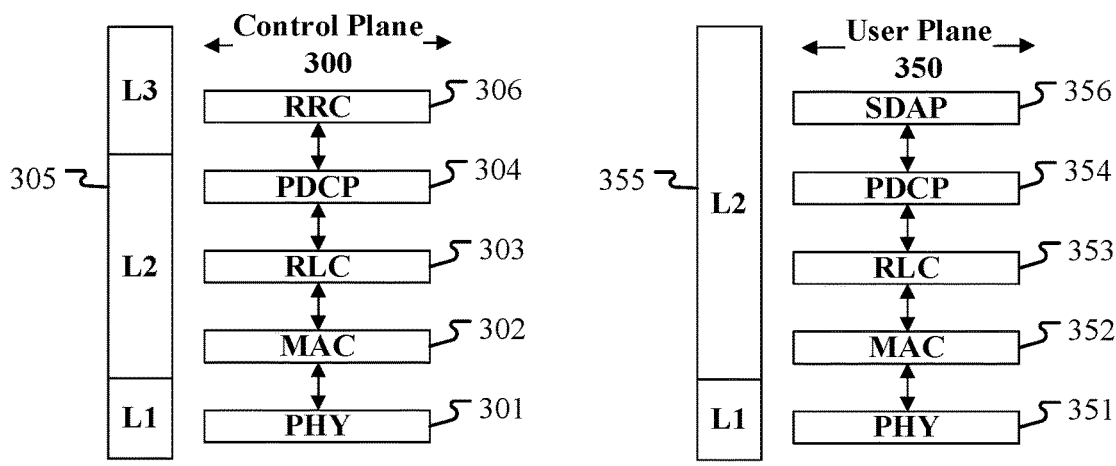
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2 X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mappingbetween QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information block in the present application is generated by the RRC sublayer 306.

In one embodiment, the first information block in the present application is generated by the MAC sublayer 302.

In one embodiment, the first information block in the present application is generated by the MAC sublayer 352.

In one embodiment, the second information block in the present application is generated by the RRC sublayer 306.

In one embodiment, the second information block in the present application is generated by the MAC sublayer 302.

In one embodiment, the second information block in the present application is generated by the MAC sublayer 352.

In one embodiment, the first signaling in the present application is generated by the RRC sublayer 306.

In one embodiment, the first signaling in the present application is generated by the MAC sublayer 302.

In one embodiment, the first signaling in the present application is generated by the MAC sublayer 352.

In one embodiment, the first signaling in the present application is generated by the PHY 301.

In one embodiment, the first signaling in the present application is generated by the PHY 351.

In one embodiment, at least one bit in the target bit block in the present application is generated by the RRC sublayer 306.

In one embodiment, at least one bit in the target bit block in the present application is generated by the MAC sublayer 302.

In one embodiment, at least one bit in the target bit block in the present application is generated by the MAC sublayer 352.

In one embodiment, at least one bit in the target bit block in the present application is generated by the PHY 301.

In one embodiment, at least one bit in the target bit block in the present application is generated by the PHY 351.

In one embodiment, at least one bit in the first bit block in the present application is generated by the RRC sublayer 306.

In one embodiment, at least one bit in the first bit block in the present application is generated by the MAC sublayer 302.

In one embodiment, at least one bit in the first bit block in the present application is generated by the MAC sublayer 352.

In one embodiment, at least one bit in the first bit block in the present application is generated by the PHY 301.

In one embodiment, at least one bit in the first bit block in the present application is generated by the PHY 351.

In one embodiment, at least one bit in the second bit block in the present application is generated by the RRC sublayer 306.

In one embodiment, at least one bit in the second bit block in the present application is generated by the MAC sublayer 302.

In one embodiment, at least one bit in the second bit block in the present application is generated by the MAC sublayer 352.

In one embodiment, at least one bit in the second bit block in the present application is generated by the PHY 301.

In one embodiment, at least one bit in the second bit block in the present application is generated by the PHY 351.

Embodiment 4

Figure 4:
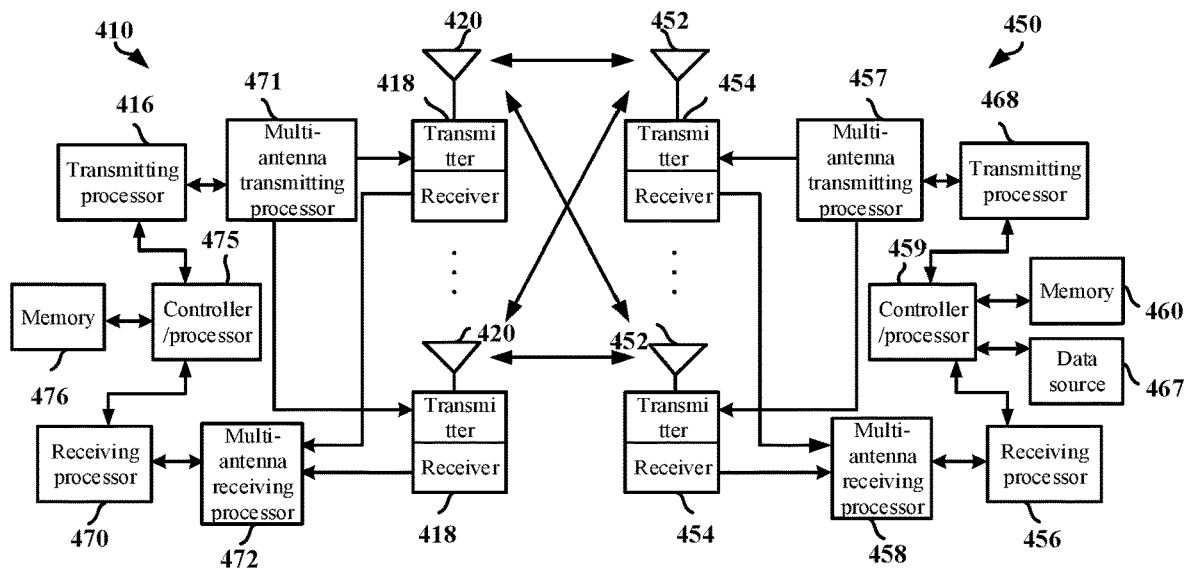
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 canbe called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE and the second node is a UE.

In one subembodiment of the above embodiment, the first node is a UE and the second node is a relay node.

In one subembodiment of the above embodiment, the first node is a relay node and the second node is a UE.

In one subembodiment of the above embodiment, the first node is a UE and the second node is a base station.

In one subembodiment of the above embodiment, the first node is a relay node and the second node is a base station.

In one subembodiment of the above embodiment, the second node is a UE and the first node is a base station.

In one subembodiment of the above embodiment, the second node is a relay node and the first node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first information block and a first signaling, the first information block is used to determine whether the first signaling comprises a target DAI field; transmits a target bit block in a first physical-layer channel, of a first bit block or a second bit block, at least the second bit block is used to generate the target bit block, the target bit block comprises at least one bit; herein, the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving a first information block and a first signaling, the first information block being used to determine whether the first signaling comprises a target DAI field; transmitting a target bit block in a first physical-layer channel, of a first bit block or a second bit block, at least the second bit block being used to generate the target bit block, the target bit block comprising at least one bit; herein, the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first information block and a first signaling, the first information block is used to determine whether the first signaling comprises a target DAI field; receives a target bit block in a first physical-layer channel, of a first bit block or a second bit block, at least the second bit block is used to generate the target bit block, the target bit block comprises at least one bit; herein, the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting a first information block and a first signaling, the first information block being used to determine whether the first signaling comprises a target DAI field; receiving a target bit block in a first physical-layer channel, of a first bit block or a second bit block, at least the second bit block being used to generate the target bit block, the target bit block comprising at least one bit; herein, the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460 or the data source 467 is used to receive the first information block in the present application.

In one embodiment, at least one of the antenna 420, the transmitter 418, the multi-antenna transmitting processor 471, the transmitting processor 416, the controller/processor 475 or the memory 476 is used to transmit the first information block in the present application.

In one embodiment, at least one of the antenna 452, the receiver 454, the multi-antenna receiving processor 458, the receiving processor 456, the controller/processor 459, the memory 460 or the data source 467 is used to receive the second information block in the present application.

In one embodiment, at least one of the antenna 420, the transmitter 418, the multi-antenna transmitting processor 471, the transmitting processor 416, the controller/processor 475 or the memory 476 is used to transmit the second information block in the present application.

In one embodiment, at least one of the antenna 452, the receiver 454, the multi-antenna receiving processor 458, the receiving processor 456, the controller/processor 459, the memory 460, or the data source 467 is used to receive the first signaling in the present application.

In one embodiment, at least one of the antenna 420, the transmitter 418, the multi-antenna transmitting processor 471, the transmitting processor 416, the controller/processor 475, or the memory 476 is used to transmit the first signaling in the present application.

In one embodiment, at least one of the antenna 452, the transmitter 454, the multi-antenna transmission processor 458, the transmitting processor 468, the controller/processor 459, the memory 460, or the data source 467 is used to transmit the target bit block in the present application in the first physical-layer channel in the present application.

In one embodiment, at least one of the antenna 420, the receiver 418, the multi-antenna receiving processor 472, the receiving processor 470, the controller/processor 475, or the memory 476 is used to receive the target bit block in the first physical-layer channel in the present application.

Embodiment 5

Figure 5:
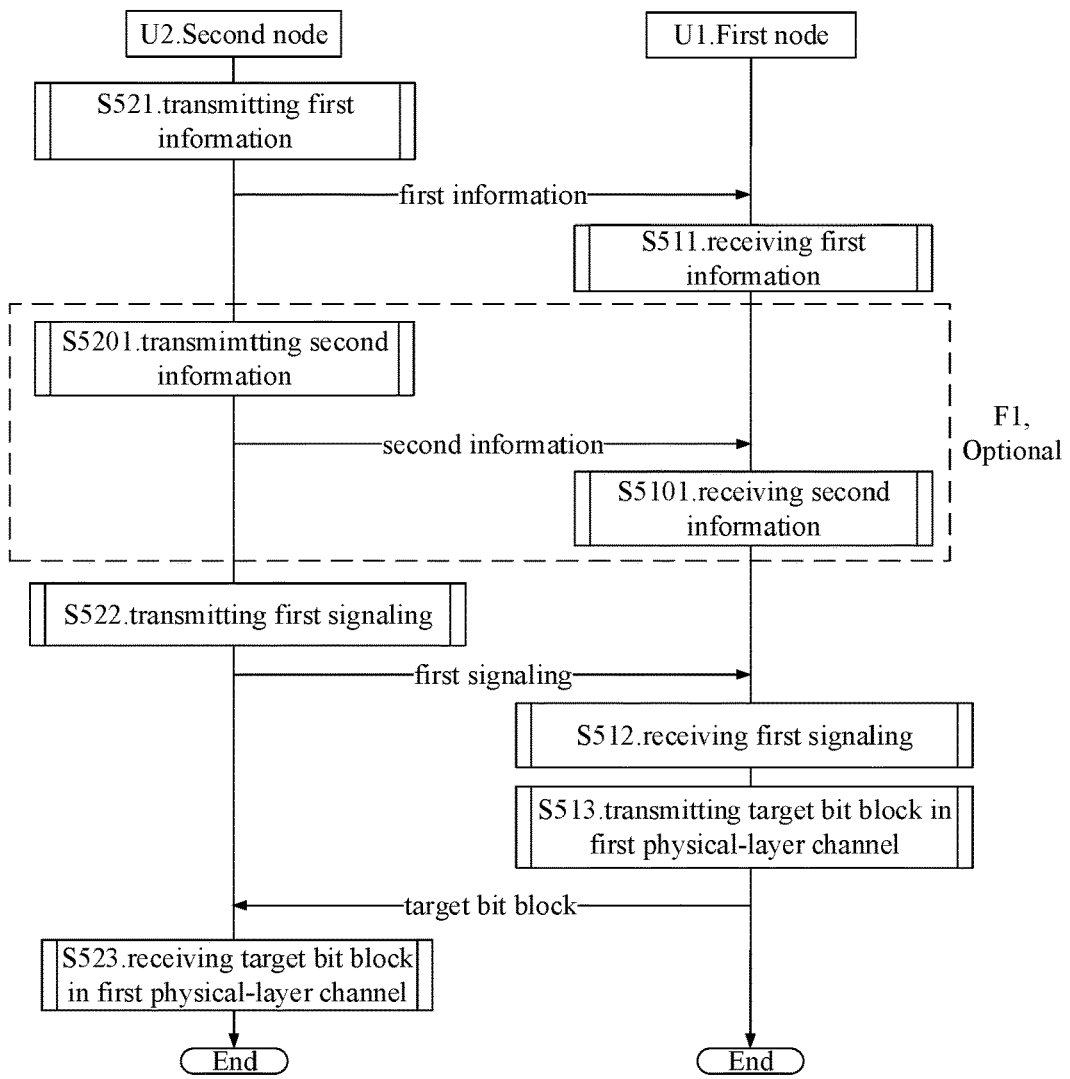
FIG. 5 illustrates a flowchart of signal transmission according to one embodiment of the present application.

Embodiment 5 illustrates a flowchart of signal transmission according to one embodiment in the present application, as shown in FIG. 5. In FIG. 5, a first node U1 and a second node U2 are in communications via an air interface. In FIG. 5, steps in dotted box F1 are optional. In particular, the sequential order between the step pairs S521 and S511 as well as S5201 and S5101 in FIG. 5 does not represent that they are chronologically arranged.

The first node U1 receives first information in step S511; receives second information in step S5101; receives a first signaling in step S512; transmits a target bit block in a first physical-layer channel in step S513.

The second node U2 transmits first information in step S521; transmits second information in step S5201; transmits a first signaling in step S522; receives a target bit block in a first physical-layer channel in step S523.

In embodiment 5, the first information block is used to determine whether the first signaling comprises a target DAI field; of a first bit block or a second bit block, at least the second bit block being used to generate the target bit block, the target bit block comprising at least one bit; herein, the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block; any bit comprised in the second bit block belongs to the target bit block; the first bit block corresponds to a first priority index, the second bit block corresponds to a second priority, and the first priority index is different from the second priority index; the second information block is used to determine the first reference value.

In one subembodiment of embodiment 5, the number of HARQ-ACK bit(s) comprised in the first bit block is greater than the first reference value; when the first signaling does not comprise the target DAI field: a bit in the third bit block is an output after at least one operation of logical AND, logical OR, or XOR of HARQ-ACK bit(s) in the first bit block.

In one subembodiment of embodiment 5, a number of HARQ-ACK bit(s) comprised in the first bit block is greater than the first reference value; when the first signaling does not comprise the target DAI field: the third bit block comprises only partial HARQ-ACK bit(s) in the first bit block, and each of bit(s) not belonging to the third bit block in the first bit block does not belong to the target bit block.

In one embodiment, the first node U2 is the first node in the present application.

In one embodiment, the second node U2 is the second node in the present application.

In one embodiment, the first node U1 is a UE.

In one embodiment, the first node U1 is a base station.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 comprises a cellular link.

In one embodiment, an air interface between the second node U2 and the first node U1 is a PC5 interface.

In one embodiment, an air interface between the second node U2 and the first node U1 comprises a sidelink.

In one embodiment, an air interface between the second node U2 and the first node U1 comprises a radio interface between a base station and a UE.

In one embodiment, an air interface between the second node U2 and the first node U1 comprises a radio interface between a satellite and a UE.

In one embodiment, an air interface between the second node U2 and the first node U1 comprises a radio interface between UEs.

In one embodiment, the steps in dotted box F1 exist.

In one embodiment, the steps in dotted box F1 do not exist.

In one embodiment, the first information block and the second information block are received at the same time.

In one embodiment, the first information block is received before the second information block.

In one embodiment, the first information block is received after the second information block.

In one embodiment, both the first information block and the second information are received before the first signaling.

In one embodiment, the first information block is received before the first signaling.

In one embodiment, each HARQ-ACK bit in the first bit block corresponds to a DCI format, and a DCI format corresponding to any HARQ-ACK bit in the first bit block is received before the first signaling.

In one embodiment, in the present application, the meaning of a HARQ ACK bit corresponding to a DCI format comprises: the HARQ-ACK bit is used to indicate whether a DCI format is received or whether a bit block (such as a TB or a Code Block group) scheduled by the DCI format is correctly decoded.

In one embodiment, the first signaling is a DCI format, and at least one HARQ-ACK bit in the second bit block corresponds to the first signaling.

Embodiment 6

Figure 6:
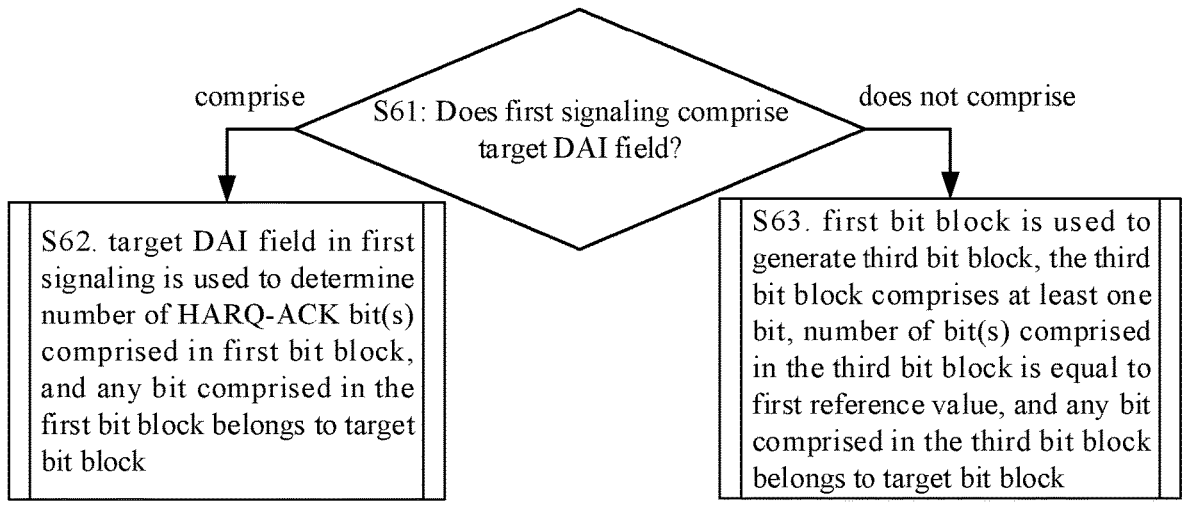
FIG. 6 illustrate a schematic diagram of a relation between whether a first signaling comprises a target DAI field and a target bit block according to one embodiment of the present application.

Embodiment 6 illustrate a schematic diagram of a relation between whether a first signaling comprises a target DAI field and a target bit block according to one embodiment of the present application, as shown in FIG. 6. In FIG. 6, determine whether a first signaling comprises a target DAI field in step S61, a target DAI field in a first signaling is used to determine a number of HARQ-ACK bit(s) comprised in a first bit block in step S62, any bit comprised in the first bit block belongs to a target bit block, a first bit block is used to generate a third bit block in step S63, the third bit block comprises at least one bit, and a number of bit(s) comprised in the third bit block is equal to a first reference value, and any bit comprised in the third bit block belongs to a target bit block.

In embodiment 6, when the first signaling in the present application comprises the target DAI field, the target DAI field in the first signaling is used to determine a number of HARQ-ACK bit(s) comprised in the first bit block in the present application, and any bit comprised in the first bit block belongs to the target bit block in the present application; when the first signaling does not comprise the target DAI field, the first bit block is used to generate a third bit block, the third bit block comprises at least one bit, a number of bit(s) comprised in the third bit block is equal to the first reference value in the present application, and any bit comprised in the third bit block belongs to the target bit block.

In one embodiment, the number of HARQ-ACK bit(s) comprised in the first bit block is greater than the first reference value.

In one embodiment, when the first signaling does not comprise the target DAI field: the third bit block comprises only partial bits and at least one compressed bit in the first bit block, and the at least one compressed bit is an output after at least one operation of logical AND, logical OR, or XOR of HARQ-ACK bit(s) in the first bit block.

In one embodiment, when the first signaling does not comprise the target DAI field: a bit in the third bit block is an output after at least one operation of logical AND, logical OR, or XOR of HARQ-ACK bit(s) in the first bit block.

In one embodiment, when the first signaling does not comprise the target DAI field: bits belonging to the first bit block and not belonging to the third bit block do not belong to the target bit block.

In one embodiment, when the first signaling does not comprise the target DAI field: bits belonging to the first bit block and not belonging to the third bit block are not transmitted.

In one embodiment, when the first signaling does not comprise the target DAI field: the third bit block comprises only partial HARQ-ACK bit(s) in the first bit block.

In one embodiment, when the first signaling does not comprise the target DAI field: the third bit block comprises only partial HARQ-ACK bit(s) in the first bit block, and each of bit(s) not belonging to the third bit block in the first bit block does not belong to the target bit block.

In one embodiment, when the first signaling does not comprise the target DAI field, a value of a bit in the third bit block is equal to an output after at least one operation of logical AND, logical OR, or XOR of HARQ-ACK bit(s) in the first bit block.

In one embodiment, the number of HARQ-ACK bit(s) comprised in the first bit block is greater than the first reference value; when the first signaling does not comprise the target DAI field, a value of a bit in the third bit block is equal to an output after at least one operation of logical AND, logical OR, or XOR of HARQ-ACK bit(s) in the first bit block.

In one embodiment, when the first signaling does not comprise the target DAI field, a value of a bit in the third bit block is equal to a result of values after an operation of logical AND of multiple HARQ-ACK bits in the first bit block.

In one embodiment, the number of HARQ-ACK bit(s) comprised in the first bit block is greater than the first reference value; when the first signaling does not comprise the target DAI field, a value of a bit in the third bit block is equal to a result of values after an operation of logical AND of multiple HARQ-ACK bits in the first bit block.

Embodiment 7

Figure 7:
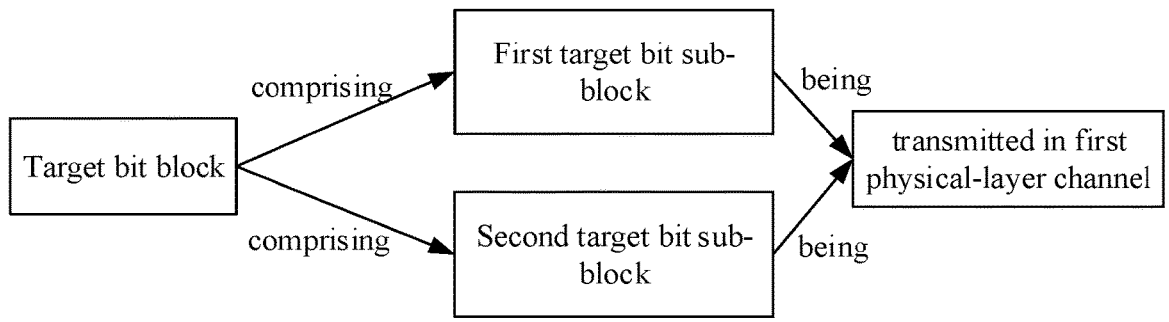
FIG. 7 illustrates a schematic diagram of relations among a target bit block, a first target bit sub-block, a second target bit sub-block and a first physical-layer channel according to one embodiment of the present application.

Embodiment 7 illustrates a schematic diagram of relations among a target bit block, a first target bit sub-block, a second target bit sub-block and a first physical-layer channel according to one embodiment of the present application, as shown in FIG. 7.

In embodiment 7, the target bit block in the present application comprises a first target bit sub-block and a second target bit sub-block, and both the first target bit sub-block and the second target bit sub-block are transmitted in the first physical-layer channel in the present application.

In one embodiment, when the first signaling comprises the target DAI field, the target DAI field in the first signaling is used to determine a number of HARQ-ACK bit(s) comprised in the first bit block, and any bit comprised in the first bit block belongs to the first target bit sub-block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the first target bit sub-block.

In one embodiment, the second bit block is used to generate the second target bit sub-block.

In one embodiment, any bit comprised in the second bit block belongs to the second target bit sub-block.

In one embodiment, the second target bit sub-block comprises only the second bit block.

In one embodiment, channel coding is respectively performed on the first target bit sub-block and the second target bit sub-block.

In one embodiment, the meaning of the phrase of both the first target bit sub-block and the second target bit sub-block being transmitted in a first physical-layer channel comprises: a first code bit sequence is acquired after the first target bit sub-block is through at least part of CRC attachment, Code Block segmentation, Code Block CRC attachment, Channel Coding, Rate Matching and Code Block Concatenation, a second code bit sequence is acquired after the second target bit sub-block is through at least part of CRC attachment, Code Block segmentation, Code Block CRC attachment, Channel Coding, Rate Matching and Code Block Concatenation, and both the first code bit sequence and the second code bit sequence are transmitted in the first physical-layer channel.

In one embodiment, the first code bit sequence and the second code bit sequence are through at least modulation and mapping to physical resources before being transmitted in the first physical-layer channel.

In one embodiment, the first code bit sequence and the second code bit sequence are through at least scrambling, modulation and mapping to physical resources before being transmitted in the first physical-layer channel.

In one embodiment, the first code bit sequence and the second code bit sequence are through at least scrambling, modulation, layer mapping and resource block mapping before being transmitted in the first physical-layer channel.

In one embodiment, the first target bit sub-block is through at least Channel Coding, Rate Matching, Scrambling, Modulation and Mapping to physical resources before being transmitted in the first physical-layer channel, and the second target bit sub-block is through at least Channel Coding, Rate Matching, Scrambling, Modulation and Mapping to physical resources before being transmitted in the first physical-layer channel.

In one embodiment, the first target bit sub-block is through at least Channel Coding, Rate Matching, Scrambling, Modulation, layer mapping and Mapping to physical resources before being transmitted in the first physical-layer channel, and the second target bit sub-block is through at least Channel Coding, Rate Matching, Scrambling, Modulation and Mapping to physical resources before being transmitted in the first physical-layer channel.

In one embodiment, both an output after the first target bit sub-block is through at least part of CRC attachment, Code Block Segmentation, Code Block CRC Attachment, Channel Coding, Rate Matching, Code Block Concatenation, Scrambling, Modulation, Spreading, Layer Mapping, Precoding, mapping to physical resources, multicarrier symbol generation and Modulation and Upconversion, as well as an output after the second target bit sub-block is through at least part of CRC attachment, Code Block segmentation, Code Block CRC Attachment, Channel Coding, Rate Matching, Code Block Concatenation, Scrambling, Modulation, Spreading, Layer Mapping, Precoding, mapping to physical resources, multicarrier symbol generation and Modulation and Upconversion are transmitted in the first physical-layer channel.

Embodiment 8

Figure 8:
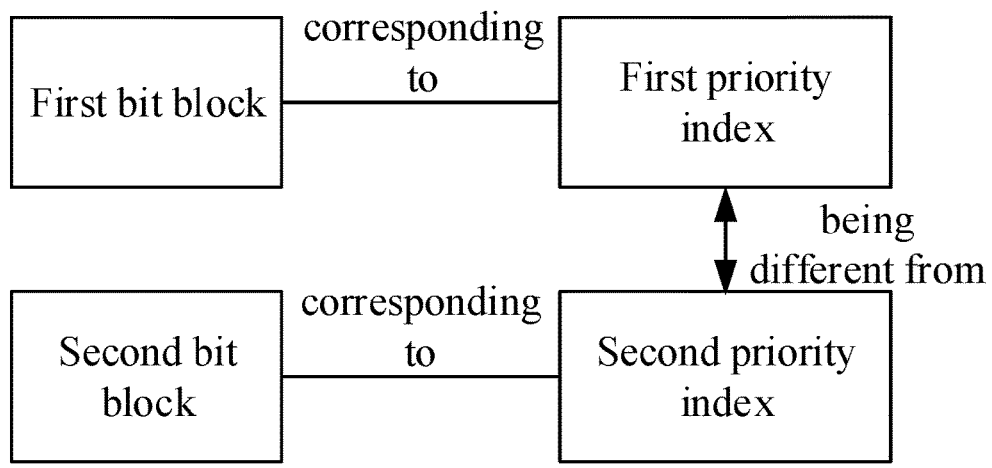
FIG. 8 illustrates a schematic diagram of relations among a first bit block, a first priority index, a second bit block and a second priority index according to one embodiment of the present application.

Embodiment 8 illustrates a schematic diagram of relations among a first bit block, a first priority index, a second bit block and a second priority index according to one embodiment of the present application, as shown in FIG. 8.

In embodiment 8, the first bit block in the present application corresponds to a first priority index, the second bit block in the present application corresponds to a second priority, and the first priority index is different from the second priority index.

In one embodiment, the first priority index and the second priority index respectively represent different priorities.

In one embodiment, the first priority index is priority index 0, and the second priority index is priority index 1.

In one embodiment, the first priority index is priority index 1, and the second priority index is priority index 0.

In one embodiment, each of HARQ-ACK bit(s) in the first bit block is a HARA-ACK bit with the first priority index.

In one embodiment, each of HARQ-ACK bit(s) in the second bit block is a HARA-ACK bit with the second priority index.

In one embodiment, each of HARQ-ACK bit(s) in the first bit block corresponds to a DCI format indicating the first priority index.

In one embodiment, each of HARQ-ACK bit(s) in the second bit block corresponds to a DCI format indicating the second priority index.

In one embodiment, the first signaling indicates the first priority index.

In one embodiment, the first signaling indicates the second priority index.

In one embodiment, a Priority indicator field in the first signaling indicates the first priority index.

In one embodiment, a Priority indicator field in the first signaling indicates the second priority index.

Embodiment 9

Figure 9:
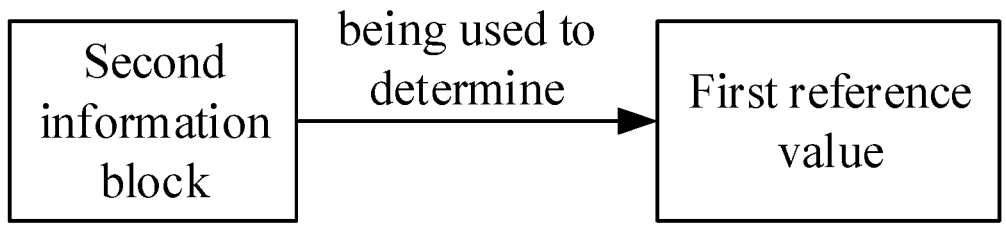
FIG. 9 illustrates a schematic diagram of a relation between a second information block and a first reference value according to one embodiment of the present application.

Embodiment 9 illustrates a schematic diagram of a relation between a second information block and a first reference value according to one embodiment of the present application, as shown in FIG. 9.

In Embodiment 9, the first node in the present application receives a second information block, and the second information block is used to determine the first reference value in the present application.

In one embodiment, the second information block comprises a higher-layer signaling.

In one embodiment, the second information block is an RRC signaling.

In one embodiment, the second information block comprises one or multiple fields in an RRC signaling.

In one embodiment, the second information block is an IE.

In one embodiment, the second information block comprises one or multiple IEs.

In one embodiment, the second information block comprises one or multiple fields in an IE.

In one embodiment, the second information block is a Medium Access Control layer Control Element (MAC CE) signaling.

In one embodiment, the second information block comprises one or multiple fields in a MAC CE signaling.

In one embodiment, the second information block comprises an IE PDSCH-Config.

In one embodiment, the second information block comprises an IE PhysicalCellGroupConfig.

In one embodiment, the second information block comprises an IE PUCCH-Config.

In one embodiment, the second information block comprises an IE PDCCH-Config.

In one embodiment, the second information block comprises an IE SearchSpace.

In one embodiment, the second information block comprises an IE ControlResourceSet.

In one embodiment, the second first information block is an IE PDSCH-Config.

In one embodiment, the second information block is an IE PhysicalCellGroupConfig.

In one embodiment, the second information block is an IE PUCCH-Config.

In one embodiment, the second information block is an IE PDCCH-Config.

In one embodiment, the second information block is an IE SearchSpace.

In one embodiment, the second information block is an IE ControlResourceSet.

In one embodiment, names of the above IEs are not case-insensitive.

In one embodiment, the second information block is the first information block.

In one embodiment, the second information block is not the first information block.

In one embodiment, the second information block is used to configure the first reference value.

In one embodiment, the second information block is used to indicate the first reference value.

In one embodiment, the second information block is used to explicitly indicate the first reference value.

In one embodiment, the second information block is used to implicitly indicate the first reference value.

In one embodiment, a first reference value set comprises multiple reference values, and the second information block is used to indicate the first reference value out of the first reference value set.

Embodiment 10

Figure 10:
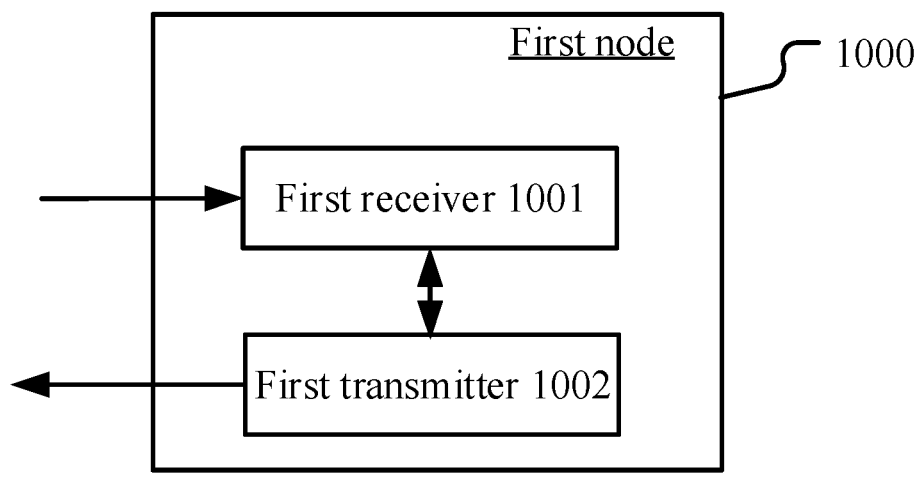
FIG. 10 illustrates a structure block diagram of a processor in a first node according to one embodiment of the present application.

Embodiment 10 illustrates a structure block diagram of a processor in a first node, as shown in FIG. 10. In FIG. 10, a processor 1000 in a first node comprises a first receiver 1001 and a first transmitter 1002.

In one embodiment, the first node 1000 is a UE.

In one embodiment, the first node 1000 is a relay node.

In one embodiment, the first node 1000 is a vehicle-mounted communication device.

In one embodiment, the first node 1000 is a UE supporting V2X communications.

In one embodiment, the first node 1000 is a relay node supporting V2X communications.

In one embodiment, the first receiver 1001 comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1001 comprises at least first five of the antenna 452, the receiver 454, the multi-antenna receiving processor 458, the receiving processor 456, the controller/processor 459, the memory 460 and the data source 467 in FIG. 4 of the present application.

In one embodiment, the first receiver 1001 comprises at least first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1001 comprises at least first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1001 comprises at least first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1002 comprises at least one of the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1002 comprises at least first five of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1002 comprises at least first four of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1002 comprises at least first three of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1002 comprises at least first two of the antenna 452, the transmitter 454, the multi-antenna transmitting processor 457, the transmitting processor 468, the controller/processor 459, the memory 460, and the data source 467 in FIG. 4 of the present application.

In one embodiment, the first receiver 1001 receives a first information block and a first signaling, the first information block is used to determine whether the first signaling comprises a target DAI field; the first transmitter 1002 transmits a target bit block in a first physical-layer channel, of a first bit block or a second bit block, at least the second bit block is used to generate the target bit block, the target bit block comprises at least one bit; herein, the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block.

In one embodiment, any bit comprised in the second bit block belongs to the target bit block.

In one embodiment, when the first signaling comprises the target DAI field: the target DAI field in the first signaling is used to indicate the number of HARQ-ACK bit(s) comprised in the first bit block.

In one embodiment, the number of HARQ-ACK bit(s) comprised in the first bit block is greater than the first reference value; when the first signaling does not comprise the target DAI field: a bit in the third bit block is an output after at least one operation of logical AND, logical OR, or XOR of HARQ-ACK bit(s) in the first bit block.

In one embodiment, a number of HARQ-ACK bit(s) comprised in the first bit block is greater than the first reference value; when the first signaling does not comprise the target DAI field: the third bit block comprises only partial HARQ-ACK bit(s) in the first bit block, and each of bit(s) not belonging to the third bit block in the first bit block does not belong to the target bit block.

In one embodiment, the first bit block corresponds to a first priority index, the second bit block corresponds to a second priority, and the first priority index is different from the second priority index.

In one embodiment, the first receiver 1001 receives a second information block; herein, the second information block is used to determine the first reference value.

In one embodiment, the first receiver 1001 receives a first information block and a first signaling, the first information block is used to determine whether the first signaling comprises a target DAI field; the first transmitter 1002 transmits a target bit block in a first physical-layer channel, of a first bit block or a second bit block, at least the second bit block is used to generate the target bit block, the target bit block comprises at least one bit; herein, the first signaling is a DCI format, and the first physical-layer channel is one of a PUCCH or a PUSCH; the first signaling is used to determine resources occupied by the first physical-layer channel; the first bit block comprises at least one HARQ-ACK bit, the second bit block comprises at least one HARQ-ACK bit, and a number of HARQ-ACK bit(s) comprised in the first bit block is greater than the first reference value; the first bit block corresponds to a first priority index, the second bit block corresponds to a second priority, and the first priority index is different from the second priority index; a first reference is equal to one of 1 or 2 or 3; any bit comprised in the second bit block belongs to the target bit block; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, a number of bit(s) comprised in the third bit block is equal to the first reference value, a value of a bit in the third bit block is equal to a result of a value after an operation of Logical ADN of multiple HARQ-ACK bits in the first bit block, and any bit comprised in the third bit block belongs to the target bit block.

In one subembodiment of the above embodiment, the target bit block comprises a first bit sub-block and a second target bit sub-block, the first code bit sequence is acquired after the first target bit sub-block is through at least part of CRC attachment, Code Block segmentation, Code Block CRC attachment, Channel Coding, Rate Matching and Code Block Concatenation, a second code bit sequence is acquired after the second target bit sub-block is through at least part of CRC attachment, Code Block segmentation, Code Block CRC attachment, Channel Coding, Rate Matching and Code Block Concatenation, and both the first code bit sequence and the second code bit sequence are transmitted in the first physical-layer channel; any bit comprised in the second bit block belongs to the second target bit sub-block; when the first signaling comprises the target DAI field, any bit comprised in the first bit block belongs to the first target bit sub-block; when the first signaling does not comprise the target DAI field, any bit comprised in the third bit block belongs to the first target bit sub-block.

Embodiment 11

Figure 11:
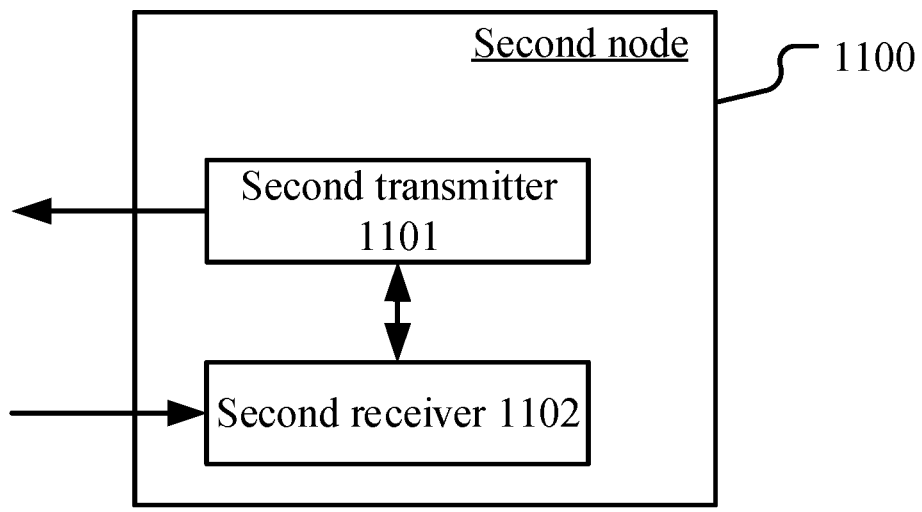
FIG. 11 illustrates a structure block diagram of a processor in second node according to one embodiment of the present application.

Embodiment 11 illustrates a structure block diagram of a processor in a second node, as shown in FIG. 11. In FIG. 11, a processor 1100 in a second node comprises a second transmitter 1101 and a second receiver 1102.

In one embodiment, the second node 1100 is a UE.

In one embodiment, the second node 1100 is a base station.

In one embodiment, the second node 1100 is a relay node.

In one embodiment, the second node 1100 is a vehicle-mounted communication device.

In one embodiment, the second node 1100 is a UE supporting V2X communications.

In one embodiment, the second transmitter 1101 comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1101 comprises at least first five of the antenna 420, the transmitter 418, the multi-antenna transmitting processor 471, the transmitting processor 416, the controller/processor 475 and the memory 476 in FIG. 4 of the present application.

In one embodiment, the second transmitter 1101 comprises at least first four of the antenna 420, the transmitter 418, the multi-antenna transmitting processor 471, the transmitting processor 416, the controller/processor 475 and the memory 476 in FIG. 4 of the present application.

In one embodiment, the second transmitter 1101 comprises at least first three of the antenna 420, the transmitter 418, the multi-antenna transmitting processor 471, the transmitting processor 416, the controller/processor 475 and the memory 476 in FIG. 4 of the present application.

In one embodiment, the second transmitter 1101 comprises at least first two of the antenna 420, the transmitter 418, the multi-antenna transmitting processor 471, the transmitting processor 416, the controller/processor 475 and the memory 476 in FIG. 4 of the present application.

In one embodiment, the second receiver 1102 comprises at least one of the antenna 420, the receiver 418, the multi-antenna receiving processor 472, the receiving processor 470, the controller/processor 475 or the memory 476 in FIG. 4 of the present application.

In one embodiment, the second receiver 1102 comprises at least first five of the antenna 420, the receiver 418, the multi-antenna receiving processor 472, the receiving processor 470, the controller/processor 475 and the memory 476 in FIG. 4 of the present application.

In one embodiment, the second receiver 1102 comprises at least first four of the antenna 420, the receiver 418, the multi-antenna receiving processor 472, the receiving processor 470, the controller/processor 475 and the memory 476 in FIG. 4 of the present application.

In one embodiment, the second receiver 1102 comprises at least first three of the antenna 420, the receiver 418, the multi-antenna receiving processor 472, the receiving processor 470, the controller/processor 475 and the memory 476 in FIG. 4 of the present application.

In one embodiment, the second receiver 1102 comprises at least first two of the antenna 420, the receiver 418, the multi-antenna receiving processor 472, the receiving processor 470, the controller/processor 475 and the memory 476 in FIG. 4 of the present application.

In one embodiment, the second transmitter 1101 transmits a first information block and a first signaling, the first information block is used to determine whether the first signaling comprises a target DAI field; the second receiver 1102 receives a target bit block in a first physical-layer channel, of a first bit block or a second bit block, at least the second bit block is used to generate the target bit block, the target bit block comprises at least one bit; herein, the first signaling is used to determine resources occupied by the first physical-layer channel; the first bit block comprises at least one HARQ-ACK bit, the second bit block comprises at least one HARQ-ACK bit, and a type of the first bit block is different from a type of the second bit block; a first reference value is a default or configurable non-negative integer; when the first signaling comprises the target DAI field, the target DAI field in the first signaling is used to determine a number of HARQ-ACK bit(s) comprised in the first bit block, and any bit comprised in the first bit block belongs to the target bit block; when the first signaling does not comprise the target DAI field, the first bit block is used to generate a third bit block, the third bit block comprises at least one bit, a number of bit(s) comprised in the third bit block is equal to the first reference value, and any bit comprised in the third bit block belongs to the target bit block.

In one embodiment, any bit comprised in the second bit block belongs to the target bit block.

In one embodiment, when the first signaling comprises the target DAI field: the target DAI field in the first signaling is used to indicate the number of HARQ-ACK bit(s) comprised in the first bit block.

In one embodiment, the number of HARQ-ACK bit(s) comprised in the first bit block is greater than the first reference value; when the first signaling does not comprise the target DAI field: a bit in the third bit block is an output after at least one operation of logical AND, logical OR, or XOR of HARQ-ACK bit(s) in the first bit block.

In one embodiment, a number of HARQ-ACK bit(s) comprised in the first bit block is greater than the first reference value; when the first signaling does not comprise the target DAI field: the third bit block comprises only partial HARQ-ACK bit(s) in the first bit block, and each of bit(s) not belonging to the third bit block in the first bit block does not belong to the target bit block.

In one embodiment, the first bit block corresponds to a first priority index, the second bit block corresponds to a second priority, and the first priority index is different from the second priority index.

In one embodiment, the second transmitter 1101 transmits a second information block; herein, the second information block is used to determine the first reference value.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IoT terminals, vehicle-mounted communication equipment, aircrafts, diminutive airplanes, unmanned aerial vehicles, telecontrolled aircrafts and other wireless communication devices. The second node in the present application includes but is not limited to mobile phones, tablet computers, notebooks, network cards, low-consumption equipment, enhanced MTC (eMTC) terminals, NB-IoT terminals, vehicle-mounted communication equipment, aircrafts, diminutive airplanes, unmanned aerial vehicles, telecontrolled aircrafts and other wireless communication devices. The UE or terminal in the present application includes but is not limited to mobile phones, tablet computers, notebooks, network cards, low-consumption equipment, enhanced MTC (eMTC) terminals, NB-IoT terminals, vehicle-mounted communication equipment, aircrafts, diminutive airplanes, unmanned aerial vehicles, telecontrolled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations, test device, test equipment, test instrument and other radio communication equipment.

It will be appreciated by those skilled in the art that this application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE), comprising:
    a receiver configured to:
        receive downlink control information (DCI) indicating one or more resources of a channel; and
        receive information indicating whether the DCI includes a Downlink Assignment Index (DAI); and
    a transmitter configured to transmit a plurality of HARQ bits on the channel, wherein the plurality of HARQ bits include one or more HARQ bits of a second type, wherein on a condition that the DCI includes the DAI, a first number of HARQ-ACK bits of a first type that are included in the plurality of HARQ bits is based on the DAI, and wherein on a condition that the DCI does not include the DAI, the HARQ-ACK bits of the first type are used to generate a set of bits having a second number, and the set of bits is included in the plurality of HARQ bits.

2. The UE according to claim 1, wherein the DCI includes the DAI, and the DAI indicates the first number of HARQ-ACK bits of the first type that are included in the plurality of HARQ bits.

3. The UE according to claim 1, wherein:
the first number of HARQ-ACK bits of the first type is greater than the second number, and on a condition that the DCI does not include the DAI, a bit of the set of bits is an outcome of at least one operation of logical AND, logical OR, or exclusive or (XOR) of bits of the HARQ-ACK bits of the first type, or the first number of HARQ-ACK bits of the first type is greater than the second number, and one a condition that the DCI does not include the DAI, the set of bits includes a portion of the HARQ-ACK bits of the first type, and remaining bits of the HARQ-ACK bits of the first type are not included in the plurality of HARQ bits.

4. The UE according to claim 1, wherein:
the HARQ-ACK bits of the first type are HARQ-ACK multicast bits and the one or more HARQ bits of the second type are HARQ-ACK unicast bits, or the HARQ-ACK bits of the first type are unicast bits and the one or more HARQ bits of the second type are HARQ-ACK bits.

5. The UE according to claim 1, wherein the HARQ-ACK bits of the first type are associated with a first priority, and the one or more HARQ bits of the second type are associated with a second priority that is different from the first priority.

6. The UE according to claim 1, wherein the receiver is configured to receive control information indicating the second number.

7. A base station, comprising:
a transmitter configured to:
transmit downlink control information (DCI) indicating one or more resources of a channel; and
transmit information indicating whether the DCI includes a Downlink Assignment Index (DAI); and
a receiver configured to transmit a plurality of HARQ bits on the channel, wherein the plurality of HARQ bits include one or more HARQ bits of a second type,
wherein on a condition that the DCI includes the DAI, a first number of HARQ-ACK bits of a first type that are included in the plurality of HARQ bits is based on the DAI, and wherein on a condition that the DCI does not include the DAI, the HARQ-ACK bits of the first type are used to generate a set of bits having a second number, and the set of bits is included in the plurality of HARQ bits.

8. The base station according to claim 7, wherein the DCI includes the DAI, and the DAI indicates the first number of HARQ-ACK bits of the first type that are included in the plurality of HARQ bits.

9. The base station according to claim 7, wherein:
the first number of HARQ-ACK bits of the first type is greater than the second number, and on a condition that the DCI does not include the DAI, a bit of the set of bits is an outcome of at least one operation of logical AND, logical OR, or exclusive or (XOR) of bits of the HARQ-ACK bits of the first type, or the first number of HARQ-ACK bits of the first type is greater than the second number, and one a condition that the DCI does not include the DAI, the set of bits includes a portion of the HARQ-ACK bits of the first type, and remaining bits of the HARQ-ACK bits of the first type are not included in the plurality of HARQ bits.

10. The base station according to claim 7, wherein:
the HARQ-ACK bits of the first type are HARQ-ACK multicast bits and the one or more HARQ bits of the second type are HARQ-ACK unicast bits, or the HARQ-ACK bits of the first type are unicast bits and the one or more HARQ bits of the second type are HARQ-ACK bits.

11. The base station according to claim 7, wherein the HARQ-ACK bits of the first type are associated with a first priority, and the one or more HARQ bits of the second type are associated with a second priority that is different from the first priority.

12. A method, comprising:
receiving downlink control information (DCI) indicating one or more resources of a channel;
receiving information indicating whether the DCI includes a Downlink Assignment Index (DAI); and
transmitting a plurality of HARQ bits on the channel, wherein the plurality of HARQ bits include one or more HARQ bits of a second type,
wherein on a condition that the DCI includes the DAI, a first number of HARQ-ACK bits of a first type that are included in the plurality of HARQ bits is based on the DAI, and wherein on a condition that the DCI does not include the DAI, the HARQ-ACK bits of the first type are used to generate a set of bits having a second number, and the set of bits is included in the plurality of HARQ bits.

13. The method according to claim 12, wherein the DCI includes the DAI, and the DAI indicates the first number of HARQ-ACK bits of the first type that are included in the plurality of HARQ bits.

14. The method according to claim 12, wherein:
the first number of HARQ-ACK bits of the first type is greater than the second number, and on a condition that the DCI does not include the DAI, a bit of the set of bits is an outcome of at least one operation of logical AND, logical OR, or exclusive or (XOR) of bits of the HARQ-ACK bits of the first type, or the first number of HARQ-ACK bits of the first type is greater than the second number, and one a condition that the DCI does not include the DAI, the set of bits includes a portion of the HARQ-ACK bits of the first type, and remaining bits of the HARQ-ACK bits of the first type are not included in the plurality of HARQ bits.

15. The method according to claim 12, wherein:
the HARQ-ACK bits of the first type are HARQ-ACK multicast bits and the one or more HARQ bits of the second type are HARQ-ACK unicast bits, or the HARQ-ACK bits of the first type are unicast bits and the one or more HARQ bits of the second type are HARQ-ACK bits.

16. The method according to claim 12, wherein the HARQ-ACK bits of the first type are associated with a first priority, and the one or more HARQ bits of the second type are associated with a second priority that is different from the first priority.

17. The method according to claim 12, comprising:
receiving receive control information indicating the second number.

\* \* \* \* \*